United States Patent
Rosso

[11] Patent Number: 6,024,995
[45] Date of Patent: *Feb. 15, 2000

[54] FOOD PRODUCT WITH A FILLING AND A METHOD OF PRODUCING IT

[75] Inventor: Renato Rosso, Alba, Italy

[73] Assignee: Soremartec S.A., Schoppach-Arlon, Belgium

[*] Notice: This patent is subject to a terminal disclaimer.

[21] Appl. No.: 09/180,719

[22] PCT Filed: Mar. 9, 1998

[86] PCT No.: PCT/EP98/01359

§ 371 Date: Mar. 5, 1999

§ 102(e) Date: Mar. 5, 1999

[87] PCT Pub. No.: WO98/41105

PCT Pub. Date: Sep. 24, 1998

[30] Foreign Application Priority Data

Mar. 14, 1997 [CH] Switzerland .............................. 0615/97

[51] Int. Cl.[7] ..................................................... A23G 3/00
[52] U.S. Cl. .......................... 426/93; 426/138; 426/302; 426/303; 426/306; 426/309; 426/660
[58] Field of Search .................................. 426/89, 93, 94, 426/104, 138, 302, 303, 306, 309, 660, 512, 514

[56] References Cited

U.S. PATENT DOCUMENTS

| | | | |
|---|---|---|---|
| 1,382,601 | 6/1921 | Cressey | 426/138 X |
| 1,524,367 | 1/1925 | Papageorge | 426/138 X |
| 2,082,312 | 6/1937 | Todd | 426/93 X |
| 2,404,177 | 7/1946 | Jetschmann | 426/138 X |
| 4,014,156 | 3/1977 | Klahn et al. | 426/93 X |
| 4,458,568 | 7/1984 | Cillario | 83/54 |
| 4,770,351 | 9/1988 | Ferrero | 241/60 |
| 4,963,379 | 10/1990 | Ferrero | 426/94 X |
| 5,792,496 | 8/1998 | Fekete et al. | 426/104 |

FOREIGN PATENT DOCUMENTS

| | | |
|---|---|---|
| 0054229 | 6/1982 | European Pat. Off. . |
| 083324 | 7/1983 | European Pat. Off. . |
| 0086319 | 8/1993 | European Pat. Off. . |
| 0583739 | 2/1994 | European Pat. Off. . |
| 0614614 | 9/1994 | European Pat. Off. . |
| 0712579 | 5/1996 | European Pat. Off. . |
| 0733308 | 9/1996 | European Pat. Off. . |
| 2472346 | 7/1981 | France . |
| 2196828 | 5/1988 | United Kingdom . |
| 95/32633 | 12/1995 | WIPO . |
| 96/28035 | 9/1996 | WIPO . |

*Primary Examiner*—Milton Cano
*Attorney, Agent, or Firm*—Rothwell, Figg, Ernst & Kurz, P.C.

[57] ABSTRACT

The product, formed essentially as a praline, comprises a shell which encloses a creamy filing with very low viscosity, possibly enhanced by a nut. The shell which is coated by one or more coating layers, possibly with the addition of a sprinkled substance and decorative element, is constituted by two half-shells, coupled face to face. One of the half-shells is made of a moldable fat-containing substance such as chocolate, whereas the other half-shell is made of wafer. The contribution of the half-shell made of a moldable substance to the weight of the shell is preferably greatly predominant in comparison with the corresponding contribution of the wafer half-shell.

19 Claims, 3 Drawing Sheets

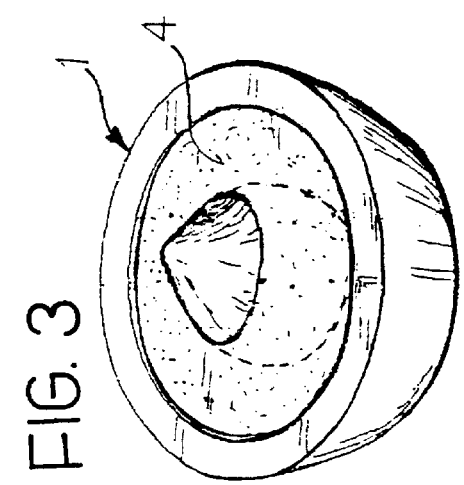
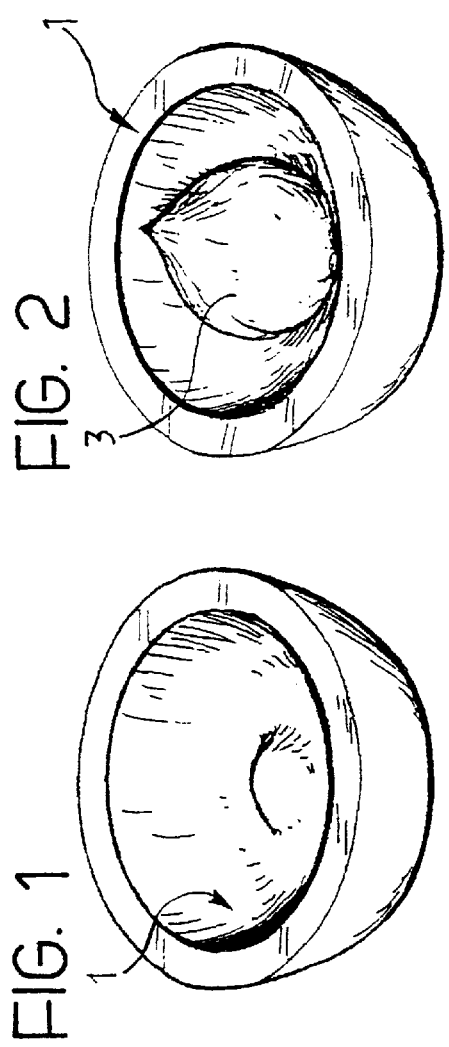
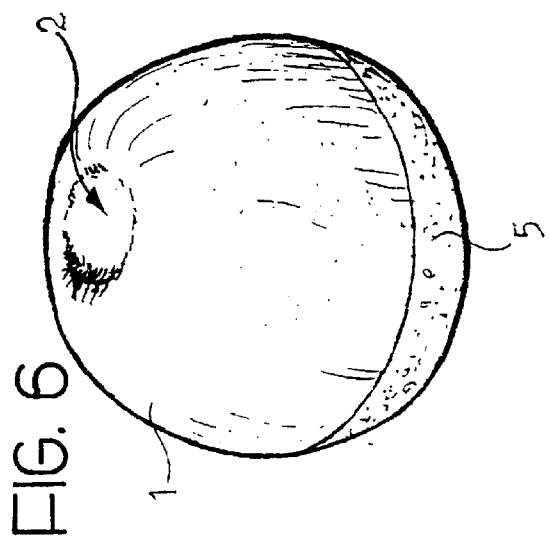
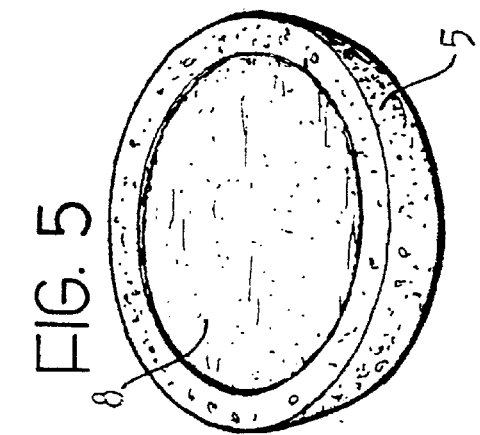
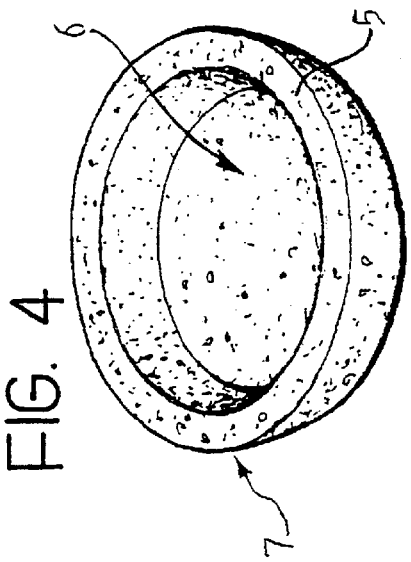

FOOD PRODUCT WITH A FILLING AND A METHOD OF PRODUCING IT

FIELD OF THE INVENTION

The present invention provides a food product having a shell with two sections of distinct materials, a soft filling within the shell, and an outer coating and a method to produce such food products.

BACKGROUND OF THE INVENTION

Food products comprising a shell that encloses a soft filling and is covered externally with at least one coating layer are well know, particularly in the form of confectionary products. For example, the Ferrero® Group markets candies under the trademarks Rocher® and Confetteria Raffaello® in which a filling is enclosed in a shell of two hemispherical wafer half-shells covered in chocolate.

However, these known food products suffer from shortcomings. In particular, known products are unsuitable from both strictly technological and organoleptic points of view for production in the form of a chilled product. For example, one well-known food product uses warm binders, such as molten chocolate, in forming the shell. The warm binders are inherently incompatible with chilled products because the warm binders generally solidify at lower temperatures. An alternative process of producing food products at warm temperatures and subsequently cooling the food products is also undesirable because this production method degrades food product's taste and appeal. For example, cooled food may become undesirably chewy or hard.

Accordingly, there is a need for a food product having a shell, a filling within the shell, and an outer covering that can be chilled while preserving desirable organoleptic characteristics. Furthermore, there is a need for a method to produce, at relatively low temperatures, food products having a shell, a filling within the shell, and an outer covering.

SUMMARY OF THE INVENTION

The present invention alleviates to a great extent the disadvantages of the known methods and apparatus by providing a food product having an inner soft filling, an outer covering, and a shell with two halves, one half-shell composed of wafer and the other half-shell composed of a moldable food substance.

In general, the present invention provides a shell with two half-shells of varying composition and physical characteristics. The two half-shell connect mouth end to mouth end to form the cavity containing the soft filling. In one embodiment, the half-shell composed of the moldable food substance is made from chocolate, and it optionally includes hazelnuts or cocoa butter. In another embodiment, the half-shell composed of wafer has a high sugar content, preferably 8–9% by weight. The half-shell composed of the moldable food substance is generally heavier than the wafer half-shell and may even be twice as heavy. In another embodiment, the half-shell composed of a moldable food substance is hemispherical, whereas the wafer half-shell is basin-shaped with a flat bottom. The wafer half-shell may even have a substantially frusto-conical shape. The half-shell composed of a moldable food substance may also have an indentation to hold an optional decorative element such as whipped cream supporting a disc-shaped object.

The present invention also provides varying fillings and outer coverings. For instance, one embodiment of the present invention has a soft filling containing a nut. Alternatively, the food product of another embodiment has an outer covering containing particulate matters such as chopped hazelnuts or grated coconuts. Furthermore, this particulate material may be located between two successive layers of the outer coating.

The present invention also provides a method of producing a food product having a soft inner filling, an outer coating, and a middle shell with two half-shells, one composed of a moldable food substance and the other composed of wafer. The process involves the steps of (1) providing a soft filling and at least two distinct half-shells, (2) coupling the half-shells to from a shell enclosing the filling, and (3) applying at least one coating to the shell. During this process, the steps of coupling of the half-shells and applying the coatings occur in controlled conditions at a temperature no higher than 8–10° C. In another embodiment, the process also includes a final step of cooling the food product to approximately 4° C. and holding this temperature.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 1 is a perspective view of a type of half-shell employed in an embodiment of an apparatus in accordance with the present invention;

FIG. 2 is a perspective view of the half-shell illustrated in FIG. 1 further including an optional nut as employed in an embodiment of an apparatus in accordance with the present invention;

FIG. 3 is a perspective view of the half-shell and nut illustrated in FIG. 2 further including a filling as employed in an embodiment of an apparatus in accordance with the present invention;

FIG. 4 is a perspective view of an alternative half-shell as employed in an embodiment of an apparatus in accordance with the present invention.

FIG. 5 is a perspective view of the half-shell of FIG. 4 further including a filling as employed in an embodiment of the an apparatus in accordance with the present invention.

FIG. 6 is a perspective view of the half-shells of FIGS. 1 and 4 combined to form a complete shell as employed in one embodiment of an apparatus in accordance with the present invention.

DETAILED DESCRIPTION OF THE INVENTION

Figure 11:
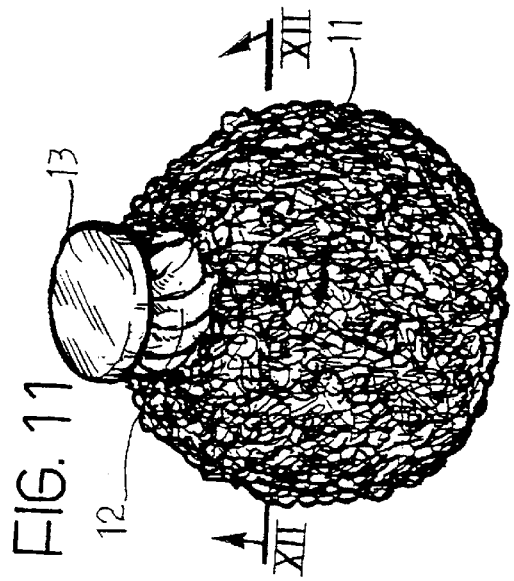
FIG. 11 is a perspective view of the another embodiment of the apparatus of FIG. 10 where the decorative element further includes a disc-piece in accordance with the present invention.
Figure 10:
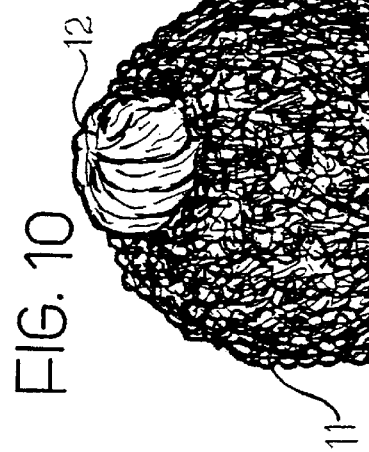
FIG. 10 is a perspective view of the complete shell, particulate matter, and outer covering of FIG. 9 further including a decorative element as employed in an embodiment of an apparatus in accordance with the present invention.

The invention will now be described, purely by way of non-limiting example, with reference to the appended drawings comprising figures numbered from 1 to 11 which show schematically the production sequence of a product according to the invention, as well as a FIG. 12, which corresponds to a section taken on the line XII—XII of FIG. 11, on a slightly enlarged scale.

In FIG. 1, a generally hemispherical half-shell made of a mouldable substance such as, for example, chocolate, is generally indicated 1. The expression "mouldable food substance" is intended to indicate herein any food substance which can be formed into the shape of a half-shell of the type shown, in the liquid or viscous state, for example, as a result of being poured into a mould, and can then be set in the shape thus reached, typically by cooling.

Although the reference to a substance such as chocolate indicates a preferred solution, it should in no way be interpreted as limiting of the scope of the invention. This also applies in particular to the use of the term "chocolate" which should not be interpreted herein as being limited exclusively to compositions which can be called chocolate within the meaning of the standards for food products which are in force in some countries. The term chocolate used herein as indicative of a mouldable substance, should therefore be interpreted as including any product or substance having rheological characteristics similar or substantially comparable to those of chocolate.

A hemispherical half-shell of material such as, for example, chocolate can be produced by known moulding, pouring and cooling techniques. These are techniques widely known in the confectionery industry and a detailed description of their characteristics is therefore unnecessary in this context.

Figure 12:
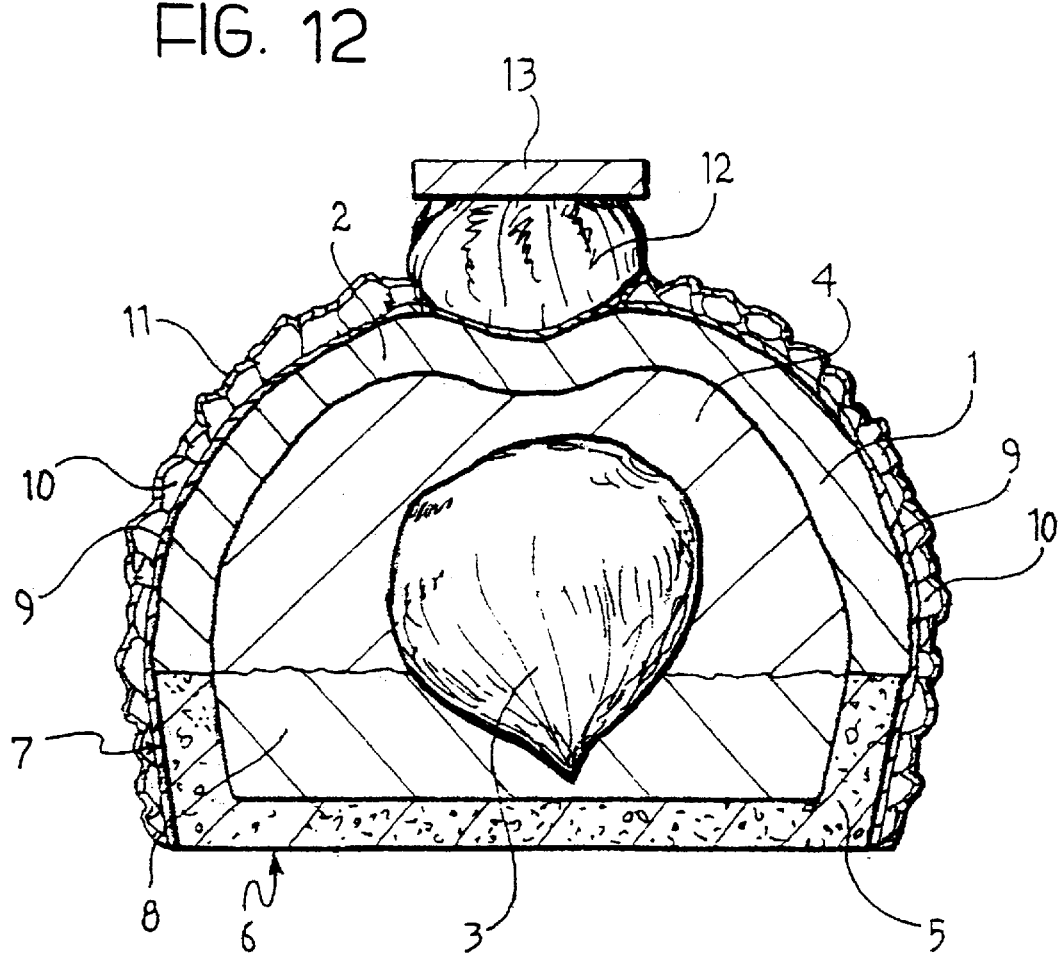
FIG. 12 is cross sectional view along the XII—XII axis of FIG. 11 of an embodiment of an apparatus in accordance with the present invention.

The half-shell 1 preferably has, in its top or polar portion, for reasons which will become clearer from the following a recessed portion 2, which can best be seen and is more noticeable in the section of FIG. 12, produced by means of a corresponding shape of the mould.

FIG. 2 shows schematically how a filling centre constituted, for example, by a nut such as, for example a hazelnut 3, may possibly but not necessarily be located inside the half-shell 1 which is subsequently to be filled with a filling 4 constituted, for example, by a chocolate-flavoured cream. This operation is performed by means normally used in the confectionery industry, which do not need to be described herein.

FIG. 4 shows in detail the structure of the other element which, together with the half-shell 1, forms the shell of the product according to the invention. This is a half-shell 5 made of wafer and preferably has a generally basin- or cup-like shape. Within the half-shell 5, which is formed by normal wafer-production techniques, it is therefore possible to distinguish a generally flat base wall 6 and an approximately frusto-conical peripheral or skirt wall 7 the mouth of which has diametral dimensions substantially corresponding to the diametral dimensions of the mouth of the half-shell 1 made of a mouldable substance.

It can be appreciated from FIG. 4 in particular that the rim of the mouth of the skirt wall 7 of the half-shell 5 is preferably produced by a cutting operation performed in a plane parallel to the general plane of the base wall 6. This result can be achieved on the basis of known solutions described for example in U.S. Pat. Nos. 4,458,568 and 4,770,351.

A similar shaping is to be found in the rim of the mouth of the half-shell 1 which thus extends in a "meridian" plane with respect to the half-shell 1.

FIG. 5 shows the filling of the wafer half-shell 5, also performed by known means, with a soft filling 8 preferably similar or substantially similar to the filling 4 in the half-shell 1.

FIG. 6 shows how, after the moulded half-shell 1 and the wafer half-shell 5 have been completed by their respective fillings, they can be fitted together face to face by virtue of the substantially corresponding diametral dimensions of their respective mouth portions. This gives rise to an intermediate product constituted essentially by a shell formed by the two half-shells 1 and 5 containing a filling formed by the fillings 4 and 8, preferably completed by the centre constituted by the nut 3.

The two half-shells 1 and 5 can be fitted together face to face in the manner described above with the use of solutions known in the art.

As a result of the closure of the shell, the product acquires a certain solidity resulting primarily from the connection established between the respective fillings 4 and 8 which are preferably constituted by an anhydrous, low-melting filling containing hazelnuts, formulated with the use of vegetable oils and fats so as to achieve an ideal creaminess at low temperatures.

Figure 7:
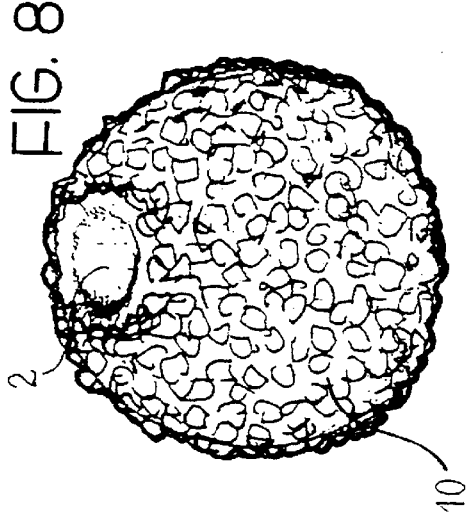
FIG. 7 is a perspective view of a complete shell with an indentation as employed in one embodiment of an apparatus in accordance with the present invention.

The intermediate product shown in FIG. 6 may be subjected, in known manner, to a first covering, or coating step, for example, with a chocolate-based substance 9 which is creamy when hot and can be set by cooling. This coating, which is preferably based on milk chocolate with the addition of nuts and vegetable oils, forms a perfect partnership with the filling of the product. This chocolate-based coating substance may then be completed by a sprinkling of a particulate substance 10 such as chopped hazelnuts, grated coconut, etc., on the product of FIG. 7 before the coating 9 has set.

Figure 8:
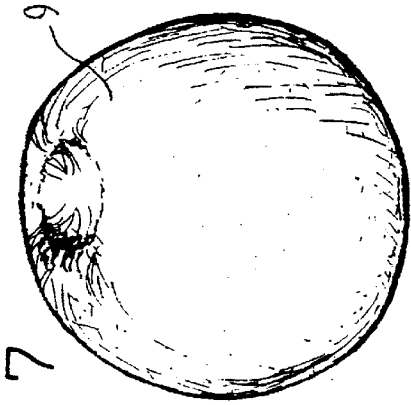
FIG. 8 is a perspective view of the complete shell of FIG. 7 further including particulate matter as employed in one embodiment of an apparatus in accordance with the present invention.

As can be seen in FIG. 8, the sprinkling operation is preferably carried out in a manner such as to affect the entire surface of the product, possibly with the exception of the recess 2, if there is one.

This result can be achieved in various ways, for example, by protecting the polar portion of the half-shell 1 in the region of the recess 2 with a screen (not shown) during the sprinkling of the particulate substance 10. Another solution is to arrange for the first coating 9 to be spread over the entire surface of the shell of the product, the half-shells 1 and 5, except for the polar region of the half-shell 1 in which the recess 2 is disposed.

Figure 9:
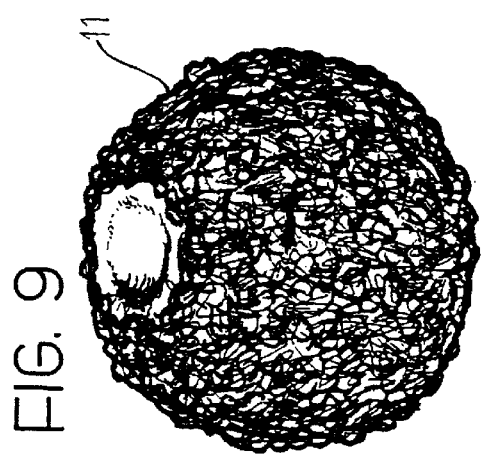
FIG. 9 is a perspective view of the complete shell and particulate matter of FIG. 8 further including an outer coating as employed in one embodiment of an apparatus in accordance with the present invention.

As shown in FIG. 9, the sprinkled layer 10 applied in the step illustrated in FIG. 8 is preferably coated with a further coating layer 11 of a substance identical or similar to that of the coating layer 9. Finally, a decoration constituted, for example, by a rosette of cream 12, possibly covered by a disc-like element 13 made of a substance such as, for example, chocolate, is placed in the recess 2 in the top or polar portion of the half-shell 1.

The finished product having the structure shown in greater detail in the sectioned view of FIG. 12 is thus produced.

As can be seen, this is essentially a praline-like product with a shell constituted by the half-shell 1 of a mouldable substance such as chocolate and by the wafer half-shell 5. The nut 3 and the fillings 4 and 8 are disposed in the shell. The shell is coated with the various coating/sprinkled layers the application of which is described above with reference to FIGS. 7 to 9, completed by the decoration 12, 13 at the top.

Although they are made of entirely different materials, the half-shells 1 and 5 are connected by being fitted together face to face, that is, with their respective mouth surfaces in frontal contact with one another, with the mouth surfaces extending so-to-speak in a "meridian" plane with respect to the general shape of the shell, that is, in a plane parallel to the plane in which the base wall 6 of the half-shell 5 extends.

The solution of the invention enables the product to retain a certain amount of wafer-like substance, the presence of which is appreciated from an organoleptic point of view as well as being useful for the purposes of the production of the product, at the same time avoiding the presence of too much wafer which could have an unpleasant effect in relation to the general appreciation of a chilled product.

By way of example, which, naturally, should not be interpreted as limiting of the scope of the invention, in the currently-preferred embodiment of the invention, if the overall weight of the shell constituted by the half-shell 1 and by the half-shell 5 is set at a value of 100, the half-shell 1 contributes about 70% of this value, and the half-shell 5 contributes about 30% (the contribution of the half-shell 1 is therefore greatly predominant and preferably at least twice the contribution of the half-shell 5. It will be appreciated in this connection that the absolute densities or specific weight of the respective component substances are usually quite different from one another.

Again for the purposes of a preferred embodiment of the invention, it has been found particularly advantageous to use, for the production of the half-shell 5, a wafer with a high sugar content, 8/9% by weight with reference to the half-shell 5 after baking with a wall thickness of the half-shell 5 of the order of 1.7±0.1 mm. With regard to the half-shell 1, the preferred selection, on the other hand, is a particular chocolate constituted by a "dark milk" base to which hazelnuts and cocoa butter are added.

Another preferred aspect of the production of the product described above is that the steps of the preparation of the half-shells 1 and 5, including the provision of their fillings 4 and 8, can take place at ambient temperature or anyway without specific temperature control; since a substance such as, for example, chocolate is concerned, the temperature values should in any case clearly not be excessive. Starting from the step of the coupling of the half-shells as illustrated in FIG. 6, it seems generally preferable to implement a temperature control which keeps the product as a whole at temperatures no higher than 8–10° C. during the coating, sprinkling, and possibly decorating steps, so that the normal range of temperatures at which a chilled product is kept, 4° C. or less, can be reached upon completion of the product.

Naturally, the principle of the invention remaining the same, the details of construction and forms of embodiment may be varied widely with respect to those described and illustrated, without thereby departing from the scope of the present invention.

I claim:

1. A food product comprising a shell which encloses a filling and is covered externally with at least one coating layer, the shell comprising at least two half-shells coupled with one another, wherein, of the at least two half-shells, one is made of a moldable fat-containing food substance and the other is made of wafer.

2. A product according to claim 1, wherein the weight of said one half-shell is greater than the weight of said other half shell.

3. A product according to claim 2, wherein the weight of said one half-shell is at least twice the weight of said other half-shell.

4. A product according claims 1 wherein said one of the half-shells is hemispherical, whilst said other half shell has a basin configuration with a flat base.

5. A product according to the claim 4, wherein said other of the half-shells has a generally frusto-conical shape.

6. A product according to claim 1, wherein the at least two half-shells are fitted together with their respected mouth surfaces coupled face to face.

7. A product according to claim 1, wherein said one of the half-shells is made substantially from chocolate.

8. A product according to claim 7, wherein hazelnuts and/or cocoa butter are added to the chocolate.

9. A product according to claim 1, wherein said other of the half-shells is made of wafer having sugar, in the order of 8–9% by weight relative to said other half-shell.

10. A product according to claims 1, wherein the filling comprises a nut.

11. A product according to claims 1, wherein a particulate substance is added to the at least one coating layer.

12. A product according to claim 11, wherein the particulate substance comprises chopped hazelnuts or grated coconut.

13. A product according to claim 11, wherein the particular substance is included between two successive coating layers.

14. A product according to claim 1 further comprising, a decorative element applied to said one of the half-shells.

15. A product according to claim 14, wherein said one of the half-shells has a recess for housing the decorative element.

16. A product according to claim 14, further comprising a particulate substance added to the at least one coating layer, wherein the particulate substance is absent from the region of the decorative element.

17. A product according to claims 14, wherein the decorative element comprises a rosette of a creamy substance on which a disc-shaped element is placed.

18. A method of producing a food product comprising the steps of:

providing at least two half-shells and a filling wherein one of the half shells is made of a moldable fat-containing food substance and the other half-shell is made of wafer;

coupling the half-shells to form a shell enclosing the filling as a result of the connection of the half-shells; and applying at least one coating layer to the shell to form a finished product, wherein the steps starting from the coupling of the half-shells are being performed in controlled conditions at a temperature no higher than approximately 8–10° C.

19. A method according to claim 18 further comprising the step of bringing the finished product to a temperature of the order of 4° C. or less and keeping the finished product at that temperature, giving the finished product the character of a chilled product.

* * * * *

UNITED STATES PATENT AND TRADEMARK OFFICE
CERTIFICATE OF CORRECTION

PATENT NO. : 6,024,995
DATED : February 15, 2000
INVENTOR(S) : Rosso

Page 1 of 1

It is certified that error appears in the above-identified patent and that said Letters Patent is hereby corrected as shown below:

On the patent cover page, please delete "[*] Notice: This patent is subject to terminal dis-claimer."

Signed and Sealed this

Twelfth Day of June, 2001

*Attest:*

*Nicholas P. Godici*

*Attesting Officer*

NICHOLAS P. GODICI
*Acting Director of the United States Patent and Trademark Office*